United States Patent [19]

Ohmae et al.

[11] Patent Number: 5,703,167
[45] Date of Patent: Dec. 30, 1997

[54] MODIFIER FOR RESIN AND RUBBER

[75] Inventors: Tadayuki Ohmae; Haruhiko Hisada; Kenichi Hosoda; Masahide Yoshiya; Yoshiyuki Komori, all of Osaka; Noboru Yamaguchi; Tohru Fujiki, both of Chiba; Noriyasu Yasuda, Gifu, all of Japan

[73] Assignees: Marubishi Oil Chemical Co., Ltd.; Sumitomo Chemical Company, Limited, both of Osaka, Japan

[21] Appl. No.: 818,383

[22] Filed: Mar. 14, 1997

Related U.S. Application Data

[63] Continuation of Ser. No. 363,024, Dec. 23, 1994, abandoned.

[30] Foreign Application Priority Data

Dec. 24, 1993 [JP] Japan ........................... 5-327401

[51] Int. Cl.$^6$ ........................................ C08F 8/14
[52] U.S. Cl. ................ 525/207; 525/327.4; 525/327.7; 525/385
[58] Field of Search ........................... 525/207, 385

[56] References Cited

U.S. PATENT DOCUMENTS 3,492,254  1/1970  Strand et al. .
3,544,344  12/1970  Pratt et al. .
4,127,687  11/1978  Dupont .

FOREIGN PATENT DOCUMENTS 0490565   6/1992   European Pat. Off. .
62-017055 1/1987   Japan .
2277742   11/1994  United Kingdom .
WO93/18851 9/1993  WIPO .

*Primary Examiner*—Bernard Lipman
*Attorney, Agent, or Firm*—Birch, Stewart, Kolasch & Birch, LLP

[57] ABSTRACT

A modifier for resin and rubber of which an active ingredient is a reaction product of a styrene-maleic anhydride copolymer (A) with a poly(alkylene oxide) monoalkyl ether (B), and/or a metal salt thereof, which modifier improves processability and properties of resins or rubbers. For example, the modifier provides resins or rubbers with antistatic properties. It also enhances the dispersibility of additives, e.g., a flame retardant or fillers incorporated in the resin or the rubber, and provides resins or rubbers with, for example, excellent flame retardancy and prevents the additive or the filler from blooming.

7 Claims, 1 Drawing Sheet

MODIFIER FOR RESIN AND RUBBER

This application is a continuation of application Ser. No. 08/363,024 filed on Dec. 23, 1994, now abandoned.

BACKGROUND OF THE INVENTION

1. Field of the Invention

The present invention relates to a modifier for resins and rubbers. More particularly, it relates to a modifier for resins and rubbers for improving their properties, particularly, antistatic properties, flame retardance and processability by compounding the modifier in various kinds of polymers such as thermoplastic resins and rubbers.

2. Description of the Related Art

Various kinds of polymers such as resins and rubbers are used in a large amount in a wide variety of fields such as automobile parts, electrical equipment components, information and communication equipment components, interior and exterior decorative articles, packaging materials, industrial products, miscellaneous goods, etc. by taking advantage of the respective processabilities and physical properties of these polymers.

However, there remain many problems to be solved regarding the physical properties and processability of resins and rubbers. For example, molded products prepared from many kinds of resins and rubbers are likely to be electrostatically charged since they are insulators. Consequently, such products capture dust on the surfaces thereof from the air, which deteriorate the appearance of the products; electrical shocks or sparks generated by the discharge of accumulated electrostatic charges therein may cause fire or explosion; and malfunctions in electronic equipment may occur.

Polymers such as resins or rubbers can be generally provided with antistatic properties by incorporating therein or coating thereon carbon black, metal powders, or organic antistatic agents of various kinds. However, the use of carbon black or a metal powder deteriorates the excellent mechanical characteristics or processability of the polymers which they have originally, or makes it difficult to color the polymers. On the other hand, when water absorbing compounds such as poly(alkylene oxide) or organic antistatic agents are incorporated therein or surfactants are coated on the surface of polymers, antistatic properties are undesirably lowered or eliminated by water which washes or is wiped on the surface thereof. If a large amount of an antistatic agent is incorporated in order to maintain antistatic properties, the excessive antistatic agent bleeds out on the surface with passage of time, resulting in problems such as stickiness on the surface or adhesion of dusts thereon. In addition, further problems may occur, such as for example mold staining during molding or the occurrence of faults in molded articles that are prepared.

Taking the above problems into consideration, when it is noted that any property of a resin or a rubber is intended to be improved by a modifier, the modifier should have sufficient compatibility with the resin or the rubber to be modified.

SUMMARY OF THE INVENTION

It is an object of the present invention to provide a polymer modifier which is efficient for modifying resins or rubbers. Particularly, it is an object of the present invention to provide a polymer modifier which can provide resins or rubbers with improved properties such as antistatic properties which can last for a long period of time and flame retardance, and improved processability.

It has been found that the above objects can be achieved by a modifier which comprises a reaction product of a specific styrenic copolymer with a poly(alkylene oxide) monoalkyl ether.

Accordingly, the present invention provides a modifier for resin or rubber which comprises at least one compound selected from the group consisting of a reaction product of a styrene-maleic anhydride copolymer (A) and a poly(alkylene oxide) monoalkyl ether (B) and a metal salt thereof.

The present invention also provides a thermoplastic resin composition which comprises a thermoplastic resin and the modifier of the present invention in an amount of 0.1 to 25% by weight of the thermoplastic resin, and also a molded product therefrom.

The present invention further provides a rubber composition which comprises a rubber and the modifier of the present invention in an amount of 0.1 to 25% by weight of the rubber, and also a molded product therefrom.

Although the poly(alkylene oxide) monoalkyl ether itself is known to have antistatic properties, its effect is low in comparison with anionic or cationic surfactants and is lost by water-washing a product having the poly(alkylene oxide) monoalkyl ether or wiping its surface. When it is incorporated in a polymer in a large amount to prepare a molded product, it tends to bleed out on its surface due to poor compatibility of the poly(alkylene oxide) monoalkyl ether with polymers to cause problems such as stickiness on a surface of the molded product or deteriorations of mechanical properties thereof.

The present invention can solve such the problems using a so-called "comb-like" polyol ether having an appropriate molecular weight comprising polystyrene units in main chains and poly(alkylene oxide) monoalkyl ether units in side chains, which can be prepared by reacting a terminal hydroxyl group of a poly(alkylene oxide) monoalkyl ether (B) with an anhydride group of a styrene-maleic anhydride copolymer (A). That is, a combination of the polystyrene units in the main chain which increases compatibility with various resins or rubbers and the poly(alkylene oxide) monoalkyl ether units bonded thereto in a comb-like structure in an increased molecular weight which gives rubber elastic properties can develop characteristic features which are not exhibited by conventional modifiers, for example, antistatic agents.

The comb-like polyol ether, i.e., the reaction product of the styrene-maleic anhydride copolymer with the poly (alkylene oxide) monoalkyl ether can be led to a salt structure thereof with various metals (that is, an ionomer structure), making use of carboxyl groups generated by the reaction of the styrene-maleic anhydride copolymer with the poly(alkylene oxide) monoalkyl ether, and/or unreacted acid anhydride groups in the styrene-maleic anhydride copolymer. The salt structure can not only enhance the above mentioned rubber elastic characteristics but also decrease volume resistivity of the comb-like polyol ether itself. Therefore it meets the purpose of the present invention and is a preferred embodiment of the present invention. Examples of the metal ions are a lithium ion, a sodium ion, a potassium ion, a magnesium ion, an aluminum ion, a zinc ion, etc.

The comb-like polyol ether according to the present invention has high affinity to various kinds of additives or fillers to be incorporated into resins or rubbers which have various polar groups. Therefore, it improves their dispersibility in a matrix polymer and efficiently decreases the problems such as poor appearance of a molded product therefrom and mold staining caused by blooming. Furthermore, it may improve processability of resin or rubber and the impact resistance thereof depending on the kinds of the resin or the rubber used.

BRIEF DESCRIPTION OF THE DRAWING

The FIG. 1 shows IR spectra of a modifier according to the present invention and its raw materials.

DETAILED DESCRIPTION OF THE INVENTION

Figure 1:
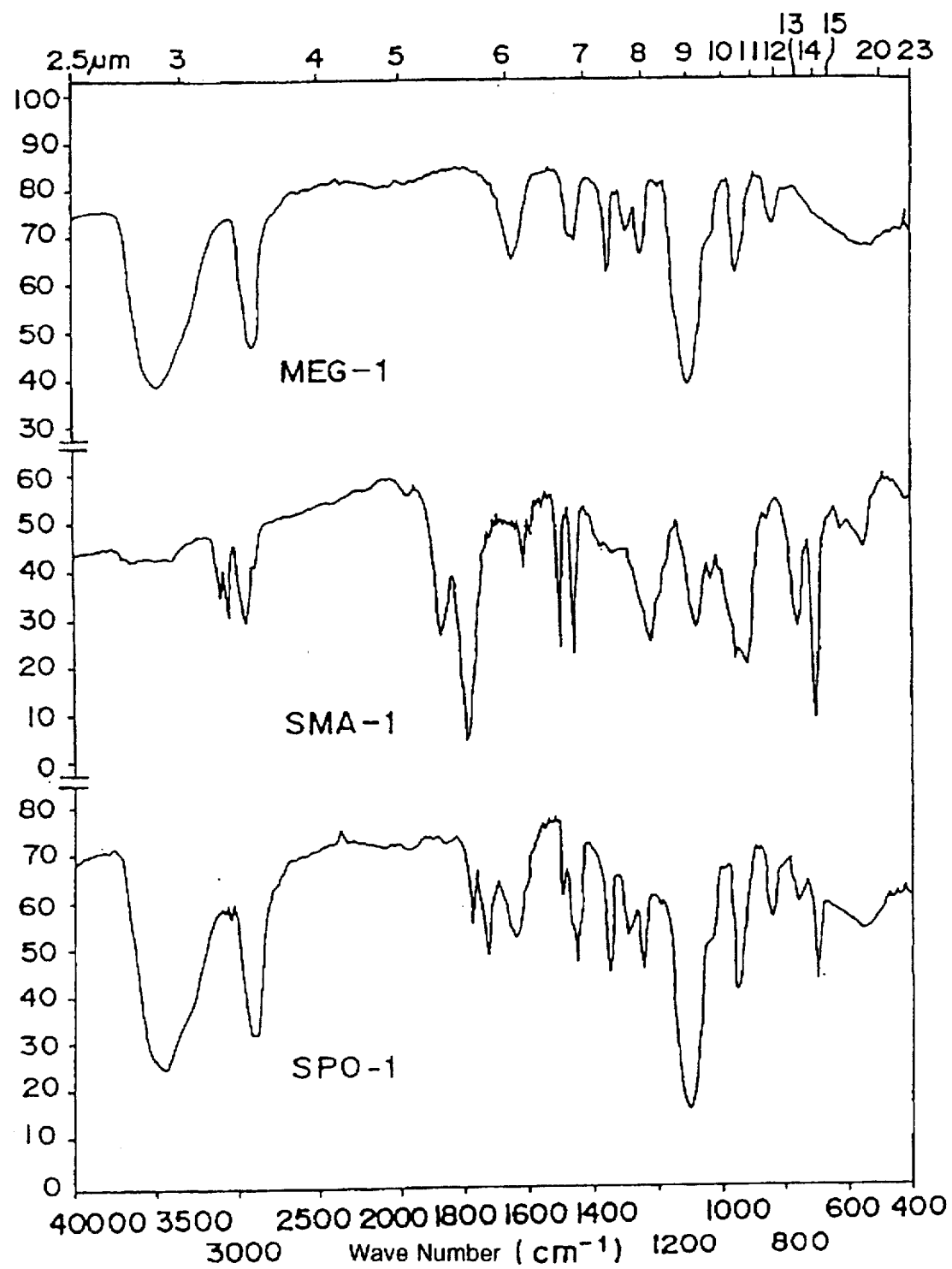

The styrene-maleic anhydride copolymer (A) used as a raw material in the present invention has a number average molecular weight of 1,000 to 400,000 and a copolymerization molar ratio of styrene to maleic anhydride of 1:1 to 9:1. For example, when the reaction of the styrene-maleic anhydride copolymer with poly(alkylene oxide) monoalkyl ether is carried out in a reactor in the absence of a solvent, the copolymer preferably has a number average molecular weight of 1,000 to 4,000 and a copolymerization molar ratio of 1:1 to 5:1. When the reaction is carried out in an extruder for plastics, the copolymer has preferably a number average molecular weight of 150,000 to 400,000 and a copolymerization molar ratio of 4:1 to 9:1. An example of the former is SMA (a trademark) resin commercially available from Elf Atochem and an example of the latter is DYLARK (a trademark) commercially available from Arco Chemical.

The poly(alkylene oxide) monoalkyl ether used as a raw material in the present invention is represented by the general formula:

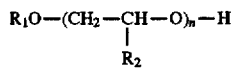

$$R_1O-(CH_2-CH-O)_n-H$$
$$\quad\quad\quad\quad\quad\ |$$
$$\quad\quad\quad\quad\ R_2$$

wherein $R_1$ represents an alkyl group containing 1 to 4 carbon atoms, $R_2$ represents a hydrogen atom or an alkyl group containing 1 or 2 carbon atoms and n is an integer of 5 to 1,000. The poly(alkylene oxide) monoalkyl ether may be a homopolymer or a copolymer (for example, a monoalkyl ether of a copolymer of a alkylene oxide in which $R_2$ is hydrogen and that in which $R_2$ is a methyl group). Among them, poly(ethylene oxide) monomethyl ether is most preferred in views of its reactivity and properties of the reaction product therefrom.

The poly(alkylene oxide) monoalkyl ether preferably has a number average molecular weight of 100 to 5,000. When its molecular weight is less than 100, antistatic properties of the reaction product are insufficient. When it is more than 5,000, its reactivity with the styrene-maleic anhydride copolymer is low. When the carbon atom number in the alkyl group in the poly(alkylene oxide) monoalkyl ether exceeds 4, antistatic properties of the reaction product are also insufficient. Poly(alkylene oxide) may be contained in an amount of not more than 20 mole % in the poly(alkylene oxide) monoalkyl ether so long as the reaction product is gelled. The incorporation of poly(alkylene oxide) is preferred in some cases since it can shift the molecular weight of the comb-form polyol ether to a higher side and enhance rubber elastic properties thereof.

The reaction of the styrene-maleic anhydride copolymer (A) with the poly(alkylene oxide) monoalkyl ether (B) may be carried out either in a batch manner using a reactor equipped with a heater and a stirrer, or in a continuous manner using a single screw or twin screw extruder which is conventionally utilized for kneading or molding resins or rubbers. In any manner, the styrene-maleic anhydride copolymer (A) and the poly(alkylene oxide) monoalkyl ether (B) are fed in such amounts that a molar ratio of a terminal hydroxyl group in (B) to a maleic anhydride group in (A) is in the range of 1.2: 1 to 0.1: 1, preferably 0.8: 1 to 0.2: 1. When the molar ratio is more than 1.2: 1, unreacted poly(alkylene oxide) monoalkyl ether (B) remains in an excessive amount in the reaction product, causing surface tackiness of the molded article comprising the reaction product and deteriorated mechanical properties thereof. When it is less than 0.1:1, antistatic properties is insufficient.

In the batch manner using a reactor, the poly(alkylene oxide) monoalkyl ether (B) is charged into a reactor in a predetermined amount and is heated to a temperature of 120° to 200° C., preferably 140° to 180° C. under a nitrogen atmosphere. Then the styrene-maleic anhydride copolymer (A) in a form of powder or pellet is gradually added to a predetermined amount with stirring thereto to react with the poly(alkylene oxide) monoalkyl ether for 10 to 300 minutes, preferably 30 to 180 minutes. When the reaction temperature is lower than 120° C., the reaction system has a high viscosity, resulting in a low reaction rate and hence a low productivity. When it is higher than 200° C., decomposition of the poly(alkylene oxide) monoalkyl ether occurs. It is important that the reaction is continued to a conversion for the poly(alkylene oxide) monoalkyl ether of not lower than 50%, preferably not lower than 65%. The conversion is measured in a method in which an excess amount of an aqueous sodium hydroxide is added to an acetone solution of the reaction product, and the resulting mixture is stirred at a room temperature for 20 minutes and then back-titrated with an aqueous sulfuric acid. In order to increase the conversion, it is preferable in some cases to use an appropriate solvent or catalyst.

A rational embodiment of the batch manner reaction involves two steps. In the first step, ring-opening polymerization of an alkylene oxide is carried out in the presence of an alcohol such as methyl alcohol, ethyl alcohol, and the like; or a low molecular weight glycol monoalkyl ether such as ethylene glycol monomethyl ether, diethylene glycol monomethyl ether and the like using a hydroxide of alkali metals (Li, Na, K) or an alcolate as a catalyst in a reactor to obtain a poly(alkylene oxide) monoalkyl ether (B). In the second step, addition-reaction of the poly(alkylene oxide) monoalkyl ether obtained in the first step and still maintained at a temperature of 140° to 180° C. by heat generated in the ring-opening polymerization is carried out with a styrene-maleic anhydride copolymer (A) in the same reactor in the second stage.

In the continuous manner using a single screw or twin screw extruder, a styrene-maleic anhydride copolymer (A) and a poly(alkylene oxide) monoalkyl ether (B) which are raw materials, and optionally a thermoplastic resin used as a diluent (C) are fed quantitatively thereto, molten and kneaded at a temperature of 150° to 250° C. to be allowed to react. A styrene-maleic anhydride copolymer (A) having a number average molecular weight of 1,000 to 4,000 may be used alone. Alternatively, a styrene-maleic anhydride copolymer (A) having a number average molecular weight of 20,000 to 40,000 may be blended therewith in an appropriate amount.

The thermoplastic resin for a diluent (C) has preferably an appropriate melt viscosity at a temperature of 150° to 250° C. and no reactive polar group. Examples of the thermoplastic resin are polyolefine resins such as polyethylene or polypropylene; and polystyrene resins such as polystyrene, rubber-modified polystyrene, styrene-acrylonitrile copolymer or acrylonitrile-butadiene-styrene copolymer. The thermoplastic resin for a diluent (C) is used in an amount of 0.5 to 10 times, preferably 1 to 5 times the sum of the styrene-maleic anhydride copolymer (A) and the poly(alkylene oxide) monoalkyl ether (B).

The poly(alkylene oxide) monoalkyl ether (B), which is previously mixed with the styrene-maleic anhydride copolymer and optionally the thermoplastic resin for a diluent (C) in a batch type mixer, may be fed through a main feeder of an extruder thereto. Alternatively, it can be fed as a molten liquid through a side feeder of the extruder thereto using a pump.

Metal salts of the reaction product of the styrene-maleic anhydride copolymer and the poly(alkylene oxide) monoalkyl ether (ionomer) can be prepared by adding an oxide, a hydroxide, a carbonate, an acetate or a higher fatty acid salt such as stearate of various metals to the reaction product, and heating and kneading the mixture at a temperature of 150° to 250° C. to neutralize the above reaction product. Preferred examples of the metal are lithium, potassium, sodium, magnesium, aluminum and zinc. 10 to 90 mole % of the sum of the acid anhydride group remaining in the reaction product and the by-produced carboxylic acid group during the reaction is preferably neutralized. The neutralization may be carried out either in a batch manner using a reactor equipped with a stirrer or in a continuous manner using a single or twin screw extruder.

The reaction product of the styrene-maleic anhydride copolymer (A) and the poly(alkylene oxide) monoalkyl ether (B) and/or the metal salt thereof are used as a modifier of polymers and rubbers for improvement of their properties and processability, for example, improvements in antistatic properties, flame retardant properties, impact resistance and flowability, and prevention of mold staining, blooming of additives, etc.

The polymers to be modified by the modifier according to the present invention include homopolymers or copolymers of olefines, such as ethylene, propylene, butene, pentene, hexene, octene, etc., for example, polyethylene, polypropylene, ethylene-propylene copolymer, ethylene-butene copolymer, ethylene-hexene copolymer and ethylene-octene copolymer; olefinic polymers, i.e., copolymers of an olefin mentioned above and a polar monomer other than olefin in which the olefine is a main component, for example, ethylene-vinyl acetate copolymer, ethylene-methyl methacrylate copolymer, ethylene-acrylic acid copolymer, ethylene-vinyl alcohol copolymer, and an admixture thereof.

They also include homopolymers or copolymers of unsaturated carboxylic acids or their alkyl esters, such as acrylic acid, methacrylic acid, methyl acrylate or methyl methacrylate; or vinyl esters such as vinyl acetate or vinyl butyrate, and an admixture of the homopolymer or the copolymer.

They further include halogen-containing resins such as polyvinyl chloride, polyvinylidene chloride, chlorinated polyethylene or chlorosulfonated polyethylene; homopolymers or copolymers of styrenic monomer, such as styrene, α-methylstyrene or vinyl toluene; vinyl aromatic polymers such as copolymers of the styrenic monomer and acrylonitrile monomers, maleimide monomers, acrylic ester monomers, or maleic monomers, and an admixture of such the polymers. The vinyl aromatic polymer may be modified by a rubber polymer. The rubber polymers include polybutadien, styrene-butadiene copolymer (HIPS), butadiene-acrylonitrile copolymer (ABS), ethylene-propylene-diene copolymer, butadiene-acrylic ester copolymer (MBS), etc.

The polymers to be modified by the modifier according to the present invention further include engineering plastic resins such as polyphenylene ether, polyethylene terephthalate, polybutylene terephthalate, polyamide, polycarbonate, polyacetal, polysulfone, polyether sulfone, polyphenylene sulfide, polyarylate, etc. They may be chemically modified, alloyed, or reinforced, for example, with glass fiber. Examples of the alloyed resin are polyphenylene ether/rubber modified polystyrene, polyphenylene ether/polyamide, polycarbonate/ABS, polycarbonate/polybutylene terephthalate, polypropylene/polyamide, polypropylen/polybutylene terephthalate, etc.

The rubbers to be modified by the modifier according to the present invention include natural rubbers, ethylene-α-olefine copolymer rubber, isoprene rubber, isoprene-isobutylene copolymer rubber, styrene-butadiene copolymer rubber, chloroprene rubber, epichlorohydrine rubber, acrylonitrile-butadiene copolymer rubber, etc. The ethylene-α-olefine copolymer rubber means a copolymer of ethylene and least one α-olefine (EPM) or a copolymer of ethylene, at least one α-olefine and at least one non-conjugated diene (EPDM). Examples of the α-olefine are propylene, 1-butene, 1-pentene, 1-hexene, etc. Examples of the non-conjugated dienes are dicyclopentadiene, ethylidenenorbornene, 1,4-hexadiene, methyltetrahydroindene, methylnorbornene, etc.

The modifier according to the present invention is added to the polymer or the rubber in an amount of 0.1 to 25% by weight, preferably 0.2 to 15% by weight, based on the weight of the polymer or the rubber, depending on modifying purposes, to form a composition.

According to final use of the molded product, heat stabilizers, age resistors, antioxidants, light stabilizers, lubricants, anti-fogging agents, pigments, organic colorants, fluorescent agents, releasing agents, processing aids, plasticizers, reinforcing agents such as glass fiber, mica or fibrous potassium titanate, filers such as calcium carbonate or talc, flame retardants and the like may be incorporated into the resin or the rubber in combination with the modifier according to the present invention.

The modifier according to the present invention has characteristic that it provide various kinds of resins or rubber with so-called "permanent antistatic properties". However, conventional antistatic agents such as sodium alkylbenezenesulfonate or sodium salt of sulfonated paraffine are not particularly limited to be co-used in order to obtain stable antistatic properties immediately after molding.

When the modifier according to the present invention is used in combination with a flame retardant, it can enhance dispersion of the flame retardant in the thermoplastic resin or rubber to be modified. Additionally, the modifier itself may be efficiently converted into a dense carbonized substance during combustion to prevent internal diffusion of oxygen and heat transfer.

The flame retardants used include organic halogen compounds described in Japanese Patent Kokoku No. 61303/1993, for example, decabromodiphenyl ether, decabromodiphenylethane, terabromo bisphenol sulfone bis (dibromopropyl) ether, tetrabromobisphenol A type epoxy resin, etc.; organic phosphorus compounds, for example, triphenyl phosphate, cresyldiphenyl phosphate, etc.; metal hydroxides, for example, aluminum hydroxide, magnesium hydroxide, etc.; and fire retarding aids, for example, antimony trioxide, molybdenum trioxide, etc.

Particularly, a composition which comprises the modifier according to the present invention, a nitrogen-containing condensed phosphoric acid compound and optionally a metal-containing compound which has carbonization-enhancing effect in an appropriate ratio can be used for polypropylene, polyethylene, polystyrene, etc. as a high-performance "non-halogen flame retardant" which generates little toxic combustion gas.

Examples of the nitrogen-containing condensed phosphoric acid compound are ammonium polyphosphate, polyphosphoryl amide, ammonium polyphosphoryl amide, melamine polyphosphate, melamine-modified ammonium polyphosphate, melamine-modified polyphosphoryl amide, melamine-modified ammonium polyphosphoryl amide, melamine-modified polyphosphoryl carbamate, polyphosphoryl carbamate, a phosphoric acid-urea-dicyandiamide-melamine reaction product, a phosphoric anhydride-urea-melamine-ammonium bicarbonate reaction product, a phosphoric anhydride-urea-melamine-ammonium bicarbonate-dicyanodiamide reaction product, and an admixture thereof. The nitrogen-containing condensed phosphoric acid compound which has a water-insoluble content of not less than 80% by weight due to sufficiently increased condensation degree by calcining is particularly preferred.

The nitrogen-containing condensed phosphoric acid compound is usually used in an amount of 5 to 50% by weight, preferably 10 to 40% by weight, based on the weight of the resin or the rubber to be modified.

The metal-containing compound which has carbonization enhancing effect is a compound which increases an amount of carbonized residue after combustion to enhance flame retardant effect although its mechanism is unclear. Examples of the metal-containing compound are organic metal complex compounds as described in "Kino Zairyo", vol. 11, No. 6, 34–41 (1991) such as ferrocene, copper dimethylglyoxime, copper acetylacetone, hydroquinoline-nickel, etc; metal salts, metal oxides, metal hydroxides and the like, such as aluminum hydroxide, magnesium hydroxide, calcium magnesium hydroxide, zirconium hydroxide, magnesium borate, manganese borate, calcium magnesium borate, titanium oxide, tin oxide, nickel oxide, zinc oxide, etc. They may be obtained from natural resources.

Particularly preferred are zinc oxide, zinc dithiocarbamate compounds, zinc mercaptobenzothiazole compounds, zinc salicyl aldehyde compounds, zinc borate, alkali earth salts of boric acid and an admixture thereof in views of flame retardant effect and industrial availability thereof.

The metal-containing compound are usually used in an amount of 0.5 to 5% by weight, preferably 1 to 3%, based on the weight of the resin or the rubber to be modified.

The resin or the rubber to be modified and the modifier according to the present invention are melt-kneaded together with the optionally added above described additives and fillers to prepare a composition and the composition is then molded to make a molded article. Conventional equipments such as a Henshel mixer, a tumbling mixer, a Banbury mixer, a mixing roll, a kneader, a single or twin screw extruder and the like can be used for mixing or melt-kneading.

The molding can be effected under conventional conditions depending on the kind of the resin or the rubber by conventional manners such as injection molding, extrusion molding, blow molding, compression molding and the like. However, since the addition of the modifier according to the present invention increases flowability of the resin or the rubber, it is also possible to effect molding under milder conditions, i.e., at a lower temperature under a lower pressure, than conventional conditions for the resin or the rubber.

The molded product can be used in wide field of applications, for example, parts of electrical and electronic equipments, for example, a TV set, a video recorder, a computer, a word processor, etc.; and parts of information and communication equipments; parts of automobiles, for example, a bumper, an instrument panel, a door trim, a tire, etc. as well as interior and exterior decorative articles, packaging materials, industrial materials, miscellaneous goods, etc.

EXAMPLES

The present invention will be illustrated by Examples more in detail but not limited thereto.

Example 1

Into a 3 L autoclave equipped with an electromagnetic stirrer, 200 g of diethylene glycol monomethyl ether and 0.4 g of sodium hydroxide in a flake form were charged and heated to 110° C. under a nitrogen stream. After a gas exchange was effected three times with ethylene oxide, the mixture was heated to 170° C. 1440 g of ethylene oxide in a liquid form was added over 2.5 hours while keeping an internal pressure at 2 kg/cm$^2$ and an internal temperature at 160° to 170° C. with an external water-cooling system to obtain a poly(ethylene oxide) monomethyl ether (referred to as MEG-1 hereinafter). A hydroxy value as measured by Standard Analysis and Test Method for Fat and Oil established by Japan Oil Chemistry Association (Pyridine-Acetic anhydride Method) was 58.3 mg KOH/g.

After it was allowed to be cooled spontaneously to 140° C. and the internal atmosphere was exchanged with nitrogen, 800 g of a styrene-maleic anhydride copolymer (a number average molecular weight: 1,900, a copolymerization molar ratio of styrene to maleic anhydride: 3:1, commercially available under a trademark of SMA 3000 from Elf Atochem) in a powder form was gradually added thereto under an ambient pressure and nitrogen atmosphere and dissolved therein with stirring. They were reacted at 180° C. for 2 hours to obtain a comb-like polyol ether (referred to as SPO-1 hereinafter). SPO-1 was a soft wax-like solid. The conversion of MEG-1 was 78% as calculated from the acid value determined by the above described titration method.

FIG. 1 shows IR spectra of MEG-1, SMA-1 and SPO-1. It can be seen that, as the result of the reaction, peak strengths due to an acid anhydride group at 1,780 cm$^{-1}$ and 1,860 cm$^{-1}$ are decreased and a new peak due to an ester group at 1,730 cm$^{-1}$ is developed in place thereof.

Example 2

Into a 1 L glass flask, 400 g of poly(ethylene oxide) monomethyl ether having a number average molecular weight of 550 (OH value: 102 mg KOH/g, commercially available under a trademark of UNIOX M-550 from Nippon Oil & Fats Co., Ltd.) (referred to as MEG-2 hereinafter) in a liquid form was charged and heated to 90° C. under a nitrogen stream with stirring. After 200 g of a styrene-maleic anhydride copolymer (a number average molecular weight: 1,600, a copolymerization molar ratio of styrene to maleic anhydride: 1:1, commercially available under a trademark of SMA Resin 1000 from Elf Atochem) (referred to as SMA-2 hereinafter) in a powder form was gradually added thereto. They were reacted at 180° C. for 3 hours to obtain a comb-like polyol ether (referred to as SPO-2 hereinafter). SPO-2 was a viscous paste. The conversion for MEG-2 was 85%.

Example 3

Into a 1 L glass flask, 400 g of a comb-like polyol ether (SPO-1) which was prepared in the same way as in Example 1 was charged and heated to 90° C. under a nitrogen stream with stirring. After 15 g of zinc stearate was then added thereto, the resulting mixture was further heated to 170° C. and stirred for 2 hours to give a transparent homogeneous liquid composition (referred to as SPO-3 hereinafter). SPO-3 was a hard block at a room temperature and is considered to be a product from a so-called "ionomerization reaction" judging from a comparison of its properties with that of SPO-1 which is a starting material thereof.

Comparative Example 1

Into a 1 L glass flask, 400 g of polyethylene glycol having a number average molecular weight of 600 (PEG 600, commercially available from NIppon Oil & Fats Co., Ltd.) in a liquid form was charged and heated to 90° C. under a nitrogen stream with stirring. 200 g of SMA-2, which was the same as used in Example 2, was then gradually added and the mixture was heated to 170° C. As SMA-2 was dissolved, the viscosity of the reaction system was rapidly increased and stirring became impossible. Therefore, the reaction was stopped. This can be considered to result from an intermolecular cross-linking reaction of the styrene-maleic anhydride with polyethylene glycol.

Example 4

In the same way using the same instruments as in Example 2, 300 g of a poly(ethylene oxide) monomethyl ether having a number average molecular weight of 2,000 (commercially available under UNIOX M-2000 from Nippon Oil & Fats Co., Ltd.) (referred to as MEG-3 hereinafter) was reacted with 200 g of SMA-1 which was the same as used in Example 1 to obtain a comb-like polyol ether (referred to as SPO-4 hereinafter). The conversion for MEG-3 was 69%. SPO-4 was a hard block at a room temperature and could be easily crushed with a mallet.

Example 5

In the same way using the same instruments as in Example 2, 400 g of a poly(ethylene oxide) monomethyl ether having a number average molecular weight of 1,000 (Commercially available under a trademark of UNIOX M-1000 from Nippon Oil & Fats Co., Ltd.) referred to as MEG-4 hereinafter) in a wax form was reacted with 200 g of a styrene-maleic anhydride copolymer (a number average molecular weight: 1,700, a copolymerization molar ratio of styrene to maleic anhydride: 2:1, commercially available under a trademark of SMA resin #2000 from Elf Atochem) (referred to as SMA-3 hereinafter) in a powder form to obtain a comb-like polyol ether (referred to as SPO-5 hereinafter). SPO-5 was a hard block at a room temperature. The conversion for MEG-4 was 81%.

Example 6

In the same way using the same instruments as in Example 2, 240 g of poly(ethylene oxide) monomethyl ether having a number average molecular weight of 400 (commercially available under a trademark of UNIOX M-400 from Nippon Oil & Fats Co., Ltd.) (referred to as MEG-5 hereinafter) in a liquid form was reacted with 320 g of a styrene-maleic anhydride copolymer (SMA-1) which was the same as used in Example 1 to obtain a comb-like polyol ether (referred to as SPO-6 hereinafter). SPO-4 was a tough rubber-like block at a room temperature. The conversion for MEG-5 was 93%.

Example 7

In the same way using the same instruments as in Example 2, 400 g of a poly(ethylene oxide) monomethyl ether (MEG-4) which was the same as used in Example 5 was reacted with 200 g of a styrene-maleic anhydride copolymer (SMA-1) which was the same as used in Example 1 to obtain a comb-like polyol ether (referred to as SPO-7 hereinafter). SPO-7 was a viscous paste at a room temperature. The conversion for MEG-4 was 80%.

Example 8

In the same way using the same instruments as in Example 2, 400 g of a poly(ethylene oxide) monomethyl ether (MEG-3) which was the same as used in Example 4 was reacted with 200 g of SMA-1 which was the same as used in Example 1 to obtain a comb-like polyol ether (referred to as SPO-8 hereinafter). The conversion for MEG-3 was 65%. SPO-8 was a hard block at a room temperature and could be easily crashed with a mallet.

Application Examples 1 to 6

To 100 parts by weight of a rubber-modified polystyrene (a melt flow rate: 2.5 g/10 min., commercially available under a trademark of Sumibright M-588 from Sumitomo Chemical Co., Ltd.), a comb-like polyol ether prepared in Examples (SPO) was added in an amount given in Table 1 and the mixture was melt-kneaded at 160° C. for 10 min. using a bench kneader (PBV-0.3 Type, commercially available from Irie Shokai Co., Ltd.). The resulting mixture was heat pressed at 200° C. under 100 kg/cm² for 5 min. to obtain a test piece of 12 cm×12 cm×2 mm in size in a seat form. Every test piece showed no surface tackiness and had a good appearance. The test piece was conditioned at a temperature of 23° C. and a relative humidity of 50% for one day and then washed with water, followed by open drying. Then its surface resistance was measured using an insulation testing set (SM-5E type, commercially available from Toa Electronics, Ltd.). Half-life of accumulated charge (in seconds) on the test piece was also measured when an electric voltage of −10 kV was applied thereto for 1 min, using a statichonest meter (S-4104 type, by Shishido Shokai Co., Ltd.). Tests results are given in Table 1.

Comparative Application Example 1

A test piece was prepared in the same way as in Application Example 1 except that a polyethylene glycol having a number average molecular weight of 2,000 (PEG 2000, commercially available from Nippon Oil & Fats Co., Ltd.) in a powder form was used in place of the comb-like polyol ether according to the present invention. Test results are given in Table 1. The test piece showed high surface tackiness immediately after the hot pressing.

Comparative Application Example 2

Comparative Application Example 1 was repeated except that sodium dodecylbenzenesulfonate was used in place of the comb-like polyol ether according to the present invention. Tests results are given in Table 1.

TABLE 1

Antistatic Effect on Polystyrene

| | Modifier | | Surface Resistance ($\Omega/\square$) | | Half-life of Accumulated Charge (sec.) | |
|---|---|---|---|---|---|---|
| | | (Amount added, parts by weight)[1] | Before water wash | After water wash | Before water wash | After water wash |
| Appl. Ex. 1 | SPO-1 | (15) | $3 \times 10^{11}$ | $2 \times 10^{11}$ | 1.3 | 1.9 |
| Appl. Ex. 2 | SPO-2 | (10) | $5 \times 10^{12}$ | $9 \times 10^{12}$ | 4.7 | 6.5 |
| Appl. Ex. 3 | SPO-3 | (10) | $2 \times 10^{12}$ | $6 \times 10^{12}$ | 2.1 | 2.3 |
| Appl. Ex. 4 | SPO-4 | (15) | $8 \times 10^{11}$ | $6 \times 10^{11}$ | 0.7 | 1.4 |
| Appl. Ex. 5 | SPO-5 | (15) | $3 \times 10^{11}$ | $1 \times 10^{11}$ | 0.6 | 0.8 |
| Appl. Ex. 6 | SPO-6 | (20) | $7 \times 10^{10}$ | $9 \times 10^{10}$ | 0.4 | 0.3 |
| Co. Appl. Ex. 1 | PEG2000 | (15) | $6 \times 10^{10}$ | $4 \times 10^{14}$ | 0.2 | >120 |
| Co. Appl. Ex. 2 | DBS | (2) | $4 \times 10^{12}$ | $7 \times 10^{15}$ | 1.5 | 39.1 |

Note:
[1] Amount added of modifier per 100 parts by weight of polystyrene (commercially available under a trademark of Sumibright M-588 from Sumitomo Chemical Co., Ltd.)

Application Example 7

To 97 parts by weight of a polybutylene terephthalate resin (commercially available under a trademark of TAFPET PBT N1000 from Mitsubishi Rayon Co., Ltd.), 3 parts by weight of SPO-7 which was prepared in Example 7 was added as a modifier according to the present invention to obtain a mixture. The mixture was kneaded at a barrel temperature of 230° C. and extruded using a twin-screw extruder (TEX-30, by The Japan Steel Works Co., Ltd.) to obtain a pellet. Then the pellet was injection molded using a injection molder (IS100EN-3AV (5 oz), by Toshiba Machine Co., Ltd.) under the following conditions to obtain a test piece for property evaluation: Cylinder temperature: 260° C., Injection pressure: 1,000 kg/cm², Mold temperature: 70° C., Cooling period: 30 sec. The pellet or the test piece obtained was evaluated for the following properties:

(1) Melt Flow Rate

A melt flow rate was measured at 250° C under a load of 2.16 kg according to ASTM D1238.

(2) Tensile Properties

Yield strength (YS), ultimate strength (US) and ultimate elongation (UE) were measured using a test piece of ⅛ inch in thickness according to ASTM D638.

(3) Flexural Properties

Flexural modules (FM) and flexural strength (FS) were measured using a test piece of ⅛ inch in thickness according to ASTM D790.

(4) Impact Resistance

Notched Izod impact strength was measured at 23° C. using a test piece with notch of ⅛ inch in thickness according to ASTM D256

(5) Heat Distortion Temperature (HDT)

Heat distortion temperature was measured under a fiber stress of 4.6 kg/cm² using an unannealed test piece of ¼ inch in thickness according to ASTM D648.

(6) Electrostatic Properties

Volume resistivity (Rv) and surface resistance (Rs) were measured for a test piece which had been conditioned at 23° C. and 50% RH for 3 days after molding, using a super ultra-insulation testing set (SM-8210, an electrode for flat plate: SME-8310, by Toa Electronics. Ltd.)

Test results are summarized in Table 2.

Comparative Application Example 3

Application Example 7 was repeated except that the modifier according to the present invention was not used.

Test results are shown in Table 2.

TABLE 2

| | Appl. Examp. 7. | Com. Appl. Examp. 3 |
|---|---|---|
| Melt Flow Rate (g/10 min) | 48 | 27 |
| Tensile Properties: | | |
| YS (kg/cm²) | 500 | 550 |
| US (kg/cm²) | 350 | 540 |
| UE (kg/cm²) | 290 | 410 |
| Flexural Properties: | | |
| FM (kg/cm²) | 21,800 | 26,000 |
| FS (kg/cm²) | 790 | 900 |
| Izod Impact Strength (kg · cm/cm) | 5.2 | 4.4 |
| Heat Distortion Temp. (°C.) | 167 | 156 |
| Electrostatic Properties: | | |
| Rv ($\Omega \cdot$ cm) | $7.5 \times 10^{14}$ | $5.2 \times 10^{16}$ |
| Rs ($\Omega/\square$) | $5.5 \times 10^{12}$ | $1.1 \times 10^{17}$ |

Application Examples 8 and 9 and Comparative Application Examples 4 and 5

100 parts by weight of EPDM (an ethylene-propylene-non-conjugated diene terpolymer, commercially available under a trademark of ESPREN 524 from Sumitomo Chemical Co., Ltd.) (Application Example 8) or SBR (styrene-butadiene rubber, commercially available under a trademark of SUMITOMO SBR 1502 from Sumitomo Chemical Co., Ltd.) (Application Example 9), and carbon black, softening agents, zinc oxide, stearic acid, and SPO-8 in amounts shown in Table 3 were kneaded using a BB-2 mixer by Kobe Steel, Ltd. The kneading was effected as follows: At first only the rubber was masticated for 30 sec. and its mixture with the other materials was kneaded for 4.5 min in such a manner that temperature did not exceed 150° C. A vulcanizing agent (sulfur) and vulcanizing accelerators as shown in Table 3 were added to the resulting formulation on a 10 inch open roll mill controlled at 50° C. to obtain an unvulcanized composition.

Then it was subjected to a press vulcanization at 160° C. for 10 min. for EPDM or at 150° C. for 30 min. for SBR to obtain a vulcanized rubber composition.

The unvulcanized and vulcanized rubber composition were tested for the following properties:

(1) Unvulcanized Rubber Composition
(1—1) Mooney Viscosity and Mooney Scorch Test Mooney viscosity measurement and Mooney scorch test was effected using a SMV-201-type Mooney viscometer by Shimazu Corporation according to "Physical test method for unvulcanized rubber" stated in JIS K6300. (1-2) Osilating Vulcanization Test (ORD)

Osilating vulcanization test was effected using an oscillating disk rheometer by Toyo Seiki Seisaku-sho, Ltd. according to "Vulcanization test method by osilating vulcanization tester" stated in Japan Rubber Association Standard SRIS3105

(2) Vulcanized Rubber Composition
(2-1) Tensile Properties and Hardness

Tensile properties, i.e. ultimate strength (US) and ultimate elongation (UE) and hardness, were measured according to "Physical test method for vulcanized rubber" stated in JIS K6301

(2-2) Heat Aging Test

A test piece was allowed to be left at 100° C. for 72 hours in a gear oven. Then tensile properties, i.e. ultimate strength (US) and ultimate elongation (UE), and hardness described above were measured. Percent retention of ultimate strength, ultimate elongation and a change of hardness were calculated from the values before and after the heat treatment.

(2-3) Visual Observation

A test piece of the vulcanized rubber was allowed to be left at a room temperature and surface thereof was observed visually every predetermined time. Results are shown as follows:

(Good) ◎>o>△>X>XX (Poor)

in which "Good" means a state in which changes of the test piece such as whitening and discoloration do not occur on a surface of the test piece and it keeps lustrous smooth surface appearance like that observed immediately after molding, and "Poor" means a state in which changes such as whitening and discoloring occurs on a surface of the test piece.

Test results are summarized in Table 4.

TABLE 3

| | Appl. Examp. | | Comp. Appl. Examp. | |
|---|---|---|---|---|
| | 8 | 9 | 4 | 5 |
| Espren 524[1] | 100 | — | 100 | — |
| Sumitomo SBR 1502[2] | — | 100 | — | 100 |
| Seast SO[3] | 100 | 60 | 100 | 60 |
| PW-380[4] | 30 | — | 30 | — |
| Sunsen 4240[5] | — | 15 | — | 15 |
| ZnO | 5 | 5 | 5 | 5 |
| Stearic acid | 1 | 1 | 1 | 1 |
| Antigen 6C[6] | — | 3 | — | 3 |
| Suntite S[7] | — | 2 | — | 2 |
| Sokcinol BZ[8] | 2.0 | — | 2.0 | — |
| Sokcinol TT[9] | 0.5 | — | 0.5 | — |
| Sokcinol TRA[10] | 0.5 | — | 0.5 | — |
| Sokcinol DM[11] | 1.0 | — | 1.0 | — |
| Socinol CZ[12] | — | 1.0 | — | 1.0 |
| Sulfur | 1.0 | 2.0 | 1.0 | 2.0 |
| SPO-8 | 2 | 2 | — | — |

Notes:
[1]Ethylene-propylene-diene rubber (commercially available from Sumitomo Chemical Co., Ltd.)
[2]Styrene-butadiene rubber (commercially available from Sumitomo Chemical Co., Ltd.)
[3]FEF carbon black (commercially available from Tokai Carbon Co., Ltd.)
[4]Softening agent (commercially available from Idemitsu Kosan Co., Ltd.)
[5]Softening agent (commercially available from Japan Sun Oil Company)

TABLE 3-continued

| | Appl. Examp. | | Comp. Appl. Examp. | |
|---|---|---|---|---|
| | 8 | 9 | 4 | 5 |

[6]Age resister (commercially available from Sumitomo Chemical Co., Ltd.)
[7]Age resister (commercially available from Seiko Chemical Co., Ltd.)
[8]to [12]Crosslinking aid (commercially available from Sumitomo Chemical Co., Ltd.)

TABLE 4

| | Appl. Examp. | | Comp. Appl. Examp. | |
|---|---|---|---|---|
| | 8 | 9 | 4 | 5 |
| Unvulcanized Rubber Properties: | | | | |
| Compound Mooney (100° C.) | 60 | 47 | 60 | 50 |
| Mooney Scorch (125° C.) | | | | |
| t 5 (min) | 8 | 18 | 9 | 40 |
| t 35 (min) | 15 | 22 | 14 | 47 |
| ODR | | | | |
| Temp. (°C.) | 160 | 150 | 160 | 150 |
| MH (kgf · cm) | 39 | 43 | 40 | 39 |
| ML (kgf · cm) | 5 | 6 | 5 | 6 |
| t'c (min) | 9 | 17 | 11 | 26 |
| Vulcanized Rubber Properties: | | | | |
| Tensile Properties: | | | | |
| US (kgf/cm$^2$) | 126 | 166 | 127 | 172 |
| UE (%) | 340 | 440 | 300 | 460 |
| Hardness (JIS A) | 79 | 62 | 78 | 61 |
| Heat Aging Test: | | | | |
| Retention of US (%) | 108 | 93 | 110 | 95 |
| Retention of UE (%) | 65 | 52 | 68 | 48 |
| Change of Hardness (point) | +4 | +11 | +5 | +12 |
| Visual Observation | | | | |
| 0 day | ◎ | ◎ | △ | △ |
| 1 day | ○ | ○ | △ | X |
| 2 days | ○ | ○ | △ | X |
| 7 days | ○ | △ | X | X |
| 21 days | △ | X | XX | XX |

Application Examples 10 to 13

To 100 parts by weight of polypropylene (a density: 0.90 g/cm$^3$ a melt flow rate: 9.0 g/10 min., commercially available under a trademark of SUMITOMO NORBLEN AW564 from Sumitomo Chemical Co., Ltd.), the comb-like polyol ether prepared in Examples (SPOs), ammonium polyphosphate (a phosphorus content: 31 to 32% by weight, a nitrogen content: 14 to 16% by weight, commercially available under a trademark of SUMISAFE P from Sumitomo Chemical Co., Ltd.) and/or a melamine-modified polyphosphoryl amide (a phosphorus content: 20 to 21% by weight, a nitrogen content: 32 to 35% by weight, Commercially available under a trademark of SUMISAFE PM from Sumitomo Chemical Co., Ltd.), and zinc oxide or calcium magnesium borate in amounts shown in Table 5 were added and incorporated therein at 150° to 160° C. for 20 min. using a mixing roll to obtain a mixture. It was then heat-pressed at 200° C. under 100 kg/cm$^2$ for 5 min. to obtain a test piece of 15 cm×15 cm×3 mm in size. The test peace was evaluated for oxygen index according to JIS K7201, flammability according to a method stated in UL-94, and antistatic properties determined in the same manner as in Application Examples 1 to 6. Test results are given in Table 5.

Comparative Application Example 6

Application Example 10 was repeated except that the comb-like polyol ether according to the present invention (SPO) was not used. Test results are given in Table 5.

incorporated in the resins or the rubbers. Therefore, stain of a mold or rolls and deterioration of surface appearance of the molded article, which result from blooming of the additives or filler on a surface of the molded product, can be avoided.

TABLE 5

Antistatic and Flame Retardant Effect on Polypropylene

| | Application Example | | | | Co. Appl. |
|---|---|---|---|---|---|
| | 10 | 11 | 12 | 13 | Ex. 6 |
| Modifier | SPO-1 | SPO-1 | SPO-2 | SPO-6 | |
| (Amount)*¹ | (3) | (3) | (5) | (5) | |
| Flame Retardant*² | Su-P | | | Su-P | Su-P |
| (Amount)*¹ | (15) | | | (15) | (15) |
| | Su-PM | Su-PM | Su-PM | Su-PM | Su-PM |
| | (15) | (30) | (36) | (15) | (15) |
| Flame Retarding Aid | ZnO | CaMgBo | | | ZnO |
| *³(Amount)*¹ | (2) | (2) | | | (2) |
| Surface Resistivity ($\Omega/\square$) | | | | | |
| before water wash | $6 \times 10^{11}$ | $8 \times 10^{11}$ | $7 \times 10^{10}$ | $4 \times 10^{10}$ | $3 \times 10^{14}$ |
| after water wash | $9 \times 10^{11}$ | $3 \times 10^{12}$ | $1 \times 10^{11}$ | $8 \times 10^{10}$ | $7 \times 10^{14}$ |
| Half-life*⁴ (sec) | | | | | |
| before water wash | 5.4 | 5.3 | 0.4 | 0.3 | 72 |
| after water wash | 6.5 | 7.6 | 0.7 | 0.3 | 95 |
| Oxygen Index | 27.8 | 28.5 | 27.3 | 27.5 | 24.2 |
| Flammability(UL-94) | V-1 | V-0 | V-2 | V-1 | Failure |

Notes:
*¹Amount added per 100 parts by weight of polypropylene (commercially available under a trademark of SUMITOMO NORBLEN AW564 from Sumitomo Chemical Co., Ltd.)
*²Su-P: Sumisafe P (commercially available from Sumitomo Chemical Co., Ltd.) Su-PM: Sumisafe PM (commercially available from Sumitomo Chemical Co., Ltd.)
*³CaMgBo: Calcium Magnesium Borate
*⁴Half-life: Half-life of Accumulated Charge As described hereinbefore, the modifier according to the present invention has good compatibility with various kinds of resins or rubbers. Therefore it can improves processability of resins or rubbers and properties of a molded article prepared therefrom. For example, a molded article can be obtained which has a low surface resistivity and keeps excellent antistatic effect for a long time without being affected by washing or friction on their surface. Productivity of a molded article from resins or rubbers can also be improved by the addition of the modifier according to the present invention depending on the their kinds, their processing manners and conditions.

The modifier according to the present invention can also enhance dispersibility of various kinds of additives or fillers to be incorporated in the resins or the rubbers. Therefore it is effective for improving processability of the resins or the rubber containing the additives or the filler and properties of the molded article prepared therefrom. For example, when the modifier according to the present invention is incorporated to the resins or the rubbers in combination with a nitrogen-containing condensed phosphorus compound and a specified metal-containing compound, it provides the resins or the rubbers with not only an excellent flame retardancy, but also advantage not to generate no toxic gas during combustion. Therefore the molded product prepared therefrom does not cause problems even if it is subjected to burning disposal after it is used.

Further, the modifier according to the present invention has a high affinity to various kinds of additives or filler to be

What is claimed is:

1. A process for producing a thermoplastic resin composition which comprises a thermoplastic resin and a modifier comprising a reaction product of (A) a styrene copolymer having a number average molecular weight of 1000 to 4000 and a copolymerization ratio of styrene to maleic anhydride of 1:1 to 5:1 in moles, with (B) poly(alkylene oxide) monoalkyl ether having a number average molecular weight of 100 to 5000, the amount of the modifier being 0.1 to 25% by weight based on the weight of the thermoplastic resin, which process comprises a step of melt-kneading the modifier with the thermoplastic resin.

2. A process for producing a rubber composition which comprises a rubber and a modifier comprising a reaction product of (A) a styrene copolymer having a number average molecular weight of 1000 to 4000 and a copolymerization ratio of styrene to maleic anhydride of 1:1 to 5:1 in moles, with (B) poly(alkylene oxide) monoalkyl ether having a number average molecular weight of 100 to 5000, the amount of the modifier being 0.1 to 25% by weight based on the weight of the rubber, which process comprises a step of melt-kneading the modifier with the rubber.

3. A process according to claim 1 wherein the thermoplastic resin is a homopolymer or copolymer of olefin or an olefinic polymer.

4. A process according to claim 1 wherein the thermoplastic resin is a homopolymer or copolymer of an alkyl ester of an unsaturated carboxylic acid.

5. A process according to claim 1 wherein the thermoplastic resin is a halogen-containing resin, a homopolymer or copolymer of styrenic monomers or a vinyl aromatic polymer.

6. A process according to claim 1 wherein the thermoplastic resin is polyphenylene ether, polyethylene terephthalate, polybutylene terephathalate, polyamide, polycarbonate, polyacetal, polysulfone, polyether sulfone, polyphenylene sulfide, polyarylate, polyphenylene ether/rubber modified polystyrene alloy, polyphenylene ether/polyamide alloy, polycarbonate/ABS alloy, polycarbonate/polybutylene terephthalate alloy, polypropylene/polyamide alloy, or polypropylene/polybutylene terephthalate alloy.

7. A process according to claim 2 wherein the rubber is natural rubbers, ethylene-α-olefin copolymer rubber, isoprene rubber, isoprene-isobutylene copolymer rubber, styrene-butadiene copolymer rubber, chloroprene rubber, epichlorohydrin rubber, or acrylonitrile-butadiene copolymer rubber.

* * * * *